United States Patent
Bowman

(10) Patent No.: US 9,562,573 B2
(45) Date of Patent: Feb. 7, 2017

(54) REPLACEMENT FORWARD DRUM AND METHOD IN CERTAIN AUTOMATIC TRANSMISSIONS

(71) Applicant: Sonnax Industries, Inc., Bellows Falls, VT (US)

(72) Inventor: Jordan L. Bowman, West Chesterfield, NH (US)

(73) Assignee: Sonnax Industries, Inc., Bellows Falls, VT (US)

( * ) Notice: Subject to any disclaimer, the term of this patent is extended or adjusted under 35 U.S.C. 154(b) by 32 days.

(21) Appl. No.: 14/577,012

(22) Filed: Dec. 19, 2014

(65) Prior Publication Data
US 2015/0176659 A1 Jun. 25, 2015

Related U.S. Application Data

(60) Provisional application No. 61/918,289, filed on Dec. 19, 2013.

(51) Int. Cl.
*F16D 25/0638* (2006.01)
*F16D 13/68* (2006.01)

(52) U.S. Cl.
CPC ......... *F16D 25/0638* (2013.01); *F16D 13/683* (2013.01); *F16D 2300/12* (2013.01); *Y10T 29/49716* (2015.01)

(58) Field of Classification Search
CPC .... F16D 13/62; F16D 13/646; F16D 2300/12; F16D 25/0638; Y10T 29/49716
See application file for complete search history.

(56) References Cited

U.S. PATENT DOCUMENTS

| | | | | |
|---|---|---|---|---|
| 2003/0098217 A1* | 5/2003 | Landa | ........... | F16D 13/62 192/70.2 |
| 2004/0035667 A1* | 2/2004 | Prater | ........... | F16D 13/62 192/70.2 |
| 2004/0250593 A1* | 12/2004 | Takagi | ........... | B21D 22/14 72/340 |
| 2006/0076209 A1* | 4/2006 | Fratta | ........... | F16D 25/0638 192/85.02 |
| 2008/0093195 A1* | 4/2008 | Christensen | ........ | F16D 25/0638 192/85.44 |
| 2013/0168197 A1* | 7/2013 | Furuichi | ........... | F16D 25/044 192/85.39 |

OTHER PUBLICATIONS http://www.sonnax.com/parts/3494. "10-Clutch Drum Kit—28756-01K". Sonnax Industries, Inc. Last viewed on Feb. 5, 2015.
4T80-E Technician's Guide. Forward Clutch Apply Components. pp. 22-23. 1996 Powertrain Division, General Motors Corporation.
4T40-E Technician's Guide. Reverse Clutch Apply Components. p. 19. 1996 Powertrain Division, General Motors Corporation.

* cited by examiner

*Primary Examiner* — Robert Hodge
*Assistant Examiner* — Stacey Fluhart
(74) *Attorney, Agent, or Firm* — Downs Rachlin Martin PLLC

(57) ABSTRACT

Systems, devices, and methods for a replacement forward drum for Ford's 4R70E/W and 4R75E/W transmissions. In one embodiment, a replacement forward drum is provided that may include a high-strength structure with oil feed passageways configured to provide fluid communication with one of Ford's OE 4R70E/W or 4R75E/W stator tubes.

15 Claims, 3 Drawing Sheets

REPLACEMENT FORWARD DRUM AND METHOD IN CERTAIN AUTOMATIC TRANSMISSIONS

RELATED APPLICATION DATA

This application is a non-provisional of U.S. Provisional Patent Application Ser. No. 61/918,289, filed on Dec. 19, 2013, and titled "Forward Drum," which is incorporated by reference herein in its entirety.

FIELD OF THE INVENTION

The present invention generally relates to the field of automobile transmission forward drums. In particular, the present invention is directed to replacement forward drums for certain automatic transmissions and associated methods of manufacturing.

BACKGROUND

Ford Motor Company has utilized transmission model numbers 4R70E/W and 4R75E/W in a large number of its vehicles since the 1990s, including in many of its most popular lines of cars. FIG. 6 illustrates an exemplary Original Equipment (OE) forward drum 600 typical of those used in Ford's 4R70E/W and 4R75E/W transmissions, FIG. 6 showing the drum assembled with OE stator tube 602 and piston 608. As shown, OE drum 600 includes clutch pack portion 604 configured to house a clutch pack (not shown), piston portion 606 configured to house piston 608, and stator tube portion 610 configured to couple with OE stator tube 602. Clutch pack portion 604 includes snap ring groove 609 that, when assembled, houses a snap ring (not shown) that is configured to prevent the clutch pack from moving axially within the drum. During operation, OE drum 600 is configured to rotate around OE stator tube 602. To apply the forward clutch, pressurized oil is transmitted from OE stator tube 602 to piston cavity 612 formed between piston 608 and sidewall 614, the pressurized oil forcing the piston against the clutch pack to apply the clutches. Oil is transmitted via OE stator tube flow passageway 616, the oil flowing from the flow passageway into a first oil feed plenum 618 defined by groove 619 formed around the circumference of the stator tube. Seals 621 maintain a seal between tube 602 and drum 600, and ball 623 blocks oil from escaping from the end of flow passageway 616, such that oil is forced into first plenum 618. Stator tube portion 610 of OE drum 600 includes a plurality of oil feed bores 622 extending linearly between first oil feed plenum 618 and piston cavity 612 to provide fluid communication between the oil feed plenum and piston cavity. During manufacturing, OE drum 600 is constructed by welding clutch pack portion 604 and piston portion 606 to stator tube portion 610 at weld location 620. Oil feed bores 622 are drilled before the two portions are welded because after the drum is welded, the clutch pack portion 604 extends across the drill path for forming bores 622, such that drilling bores 622 after welding the two portions together would not be easily achievable without an appreciable increase in manufacturing costs, for example, requiring specially-designed tooling.

The 4R70E/W and 4R75E/W clutch drums fail in a relatively high number of vehicles at snap ring groove 609. Specifically, the sidewall of the clutch drum separates at the snap ring groove. Despite these transmissions being in widespread use since the 1990s, and despite all of the failures that continue to this day, no replacement drums exist that provide an adequate solution to the problem. Instead, transmission repair businesses are forced to either weld the broken drum back together, which can only be done once or twice before further re-welds are not possible, or the repair business must buy a new OE drum having the same tendency to fail.

SUMMARY OF THE DISCLOSURE

In one implementation, the present disclosure is directed to a replacement forward drum for Ford's 4R70E/W or Ford's 4R75E/W ("OE") transmission configured for installation with an OE stator tube having a side wall with an outer surface and a first oil feed plenum formed in the sidewall extending around the outer surface. The forward drum includes a unitary annular body member formed around an axis of rotation comprising a stator tube portion having an inner wall defining a stator tube bore sized and configured for receipt of the OE stator tube therein, and a second oil feed plenum formed in a direction into and around said inner wall, the second oil feed plenum being positioned to communicate with the first oil feed plenum when the OE stator tube is received in said stator tube bore, a clutch pack portion having a plurality of axial grooves, the axial grooves being configured and dimensioned for engagement with a plurality of tabs formed on clutch pack separator disks; and a piston portion disposed between the stator tube portion and the clutch pack portion, the piston portion defining a piston cavity configured and dimensioned for receipt of a forward piston therein and at least one oil feed hole extending between the second oil feed plenum and the piston cavity.

In another implementation, the present disclosure is directed to a forward drum kit for replacing Ford's 4R70E/W or Ford's 4R75E/W ("OE") forward drum, the OE forward drum having a sidewall with axial grooves and ridges formed therein and having a snap ring groove having a first outer diameter. The kit includes a replacement forward drum with a clutch pack portion including a sidewall with a minimum thickness t, the sidewall having an inner surface, the inner surface having a plurality of axial ridges and grooves, the plurality of axial ridges being configured and dimensioned for receipt of separator disk mating tabs; wherein the plurality of axial ridges formed in the replacement forward drum sidewall are solid members each having a radial height h, wherein h is greater than t.

In yet another implementation, the present disclosure is directed to a method of modifying Ford's 4R70E/W or Ford's 4R75E/W ("OE") forward drum assembly having a OE forward drum having a sidewall with axial grooves and ridges formed therein and having a snap ring groove, the axial ridges having a radial thickness and the snap ring groove having a first outer diameter, the OE forward drum having a tendency to fail during operation due to the sidewall separating at the snap ring groove. The method includes providing a replacement forward drum having a sidewall formed around an axis of rotation with a plurality of axial ridges and axial grooves, each of the axial grooves having a radial depth d and each of the axial ridges being solid members with a radial height h, wherein h is greater than the radial thickness of the OE forward drum axial ridges and wherein h is approximately equal to d.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Aspects of the present invention include systems, devices, and methods for a replacement forward drum for Ford's 4R70E/W and 4R75E/W transmissions. In one embodiment, a replacement forward drum is provided that may include a high-strength, and in some embodiments, unitary structure, with oil feed passageways configured to provide fluid communication with one of Ford's OE 4R70E/W or 4R75E/W stator tubes, which provides for installation without a need to replace the OE stator tube. Methods of manufacturing a high strength replacement forward drum from forged metal is also provided.

Figure 1:
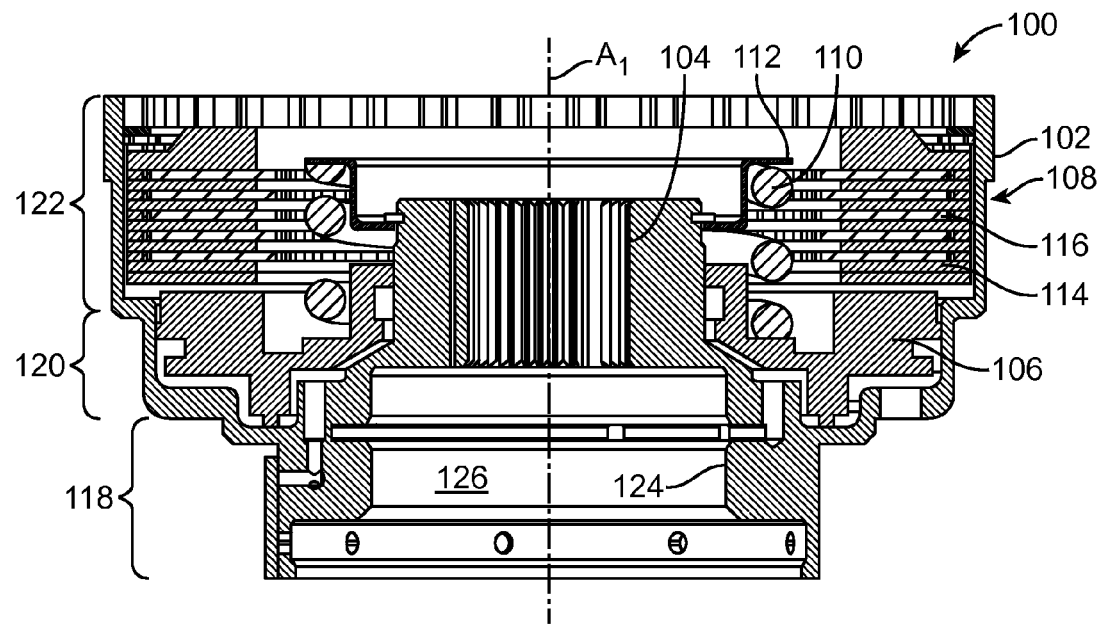
FIG. 1 is a cross section of a replacement forward drum assembly including a replacement forward drum.

FIG. 1 illustrates an exemplary forward drum assembly 100 made in accordance with the present disclosure. As shown, drum assembly 100 may include forward drum 102 configured to be rotatably disposed on a OE stator tube 602 (FIG. 2) and rotatably driven by a OE transmission input shaft (not shown) extending along central axis of rotation A1, the drum being coupled to the input shaft with splined section 104, which mates with complementary splines on the input shaft. As will be appreciated, in alternative embodiments, forward drums made in accordance with the present disclosure may be adapted for coupling to stator tubes and transmission drive shafts other than Ford's 4R70E/W and 4R75E/W OE stator tubes and shafts. Assembly 100 may also include forward piston 106 configured to move axially in drum 102 and apply force to clutch pack 108 when pressurized oil is applied to the piston. Assembly 100 may also include return spring 110, which may be disposed between spring retainer plate 112 and piston 106 and may be configured to apply an axial force to piston to return the piston to a seated position within drum 102 when the pressurized oil is no longer being applied to the piston. Clutch pack 108 may include a plurality of separator disks 114 and friction disks 116 (only one of each labeled to avoid clutter), with the friction disks being coupled to a forward hub (not shown) and the separators being coupled to drum 102 so that, when piston 106 applies force to clutch pack 108, forcing the friction and separator disks together, frictional forces between the disks prevent relative rotational movement between the disks, resulting in rotational forces from the drive shaft being transmitted through assembly 100 to the forward hub, which connects to a forward sun gear, thereby engaging forward gears.

Figure 2:
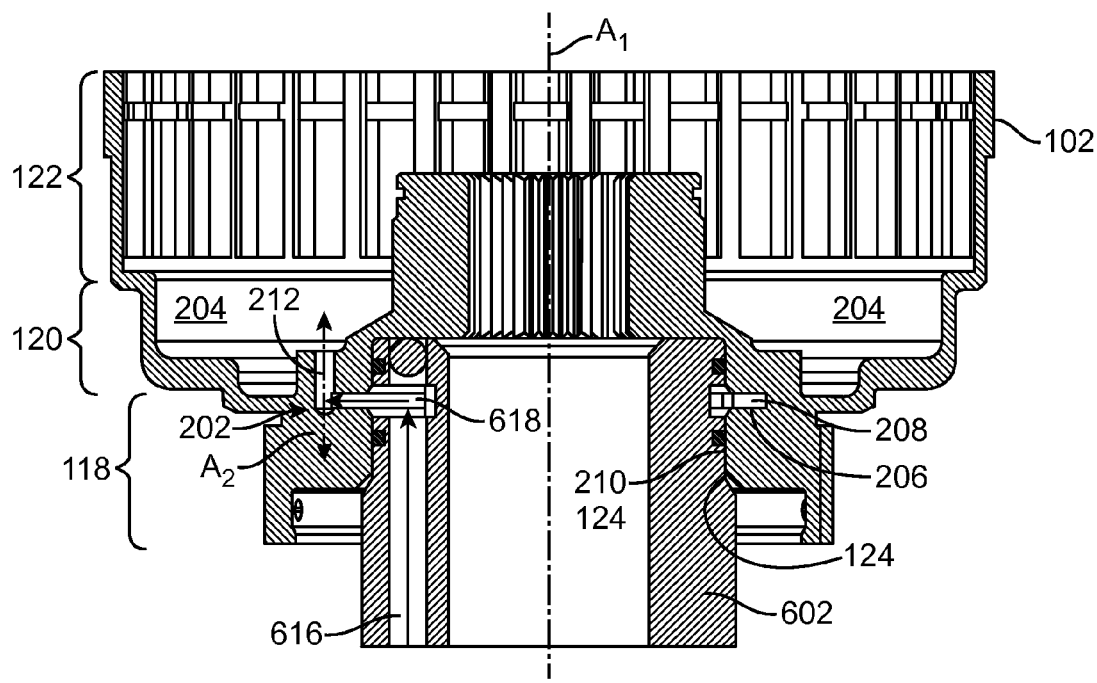
FIG. 2 is a cross section of the replacement forward drum of FIG. 1 assembled with an Original Equipment (OE) stator tube.
Figure 3:
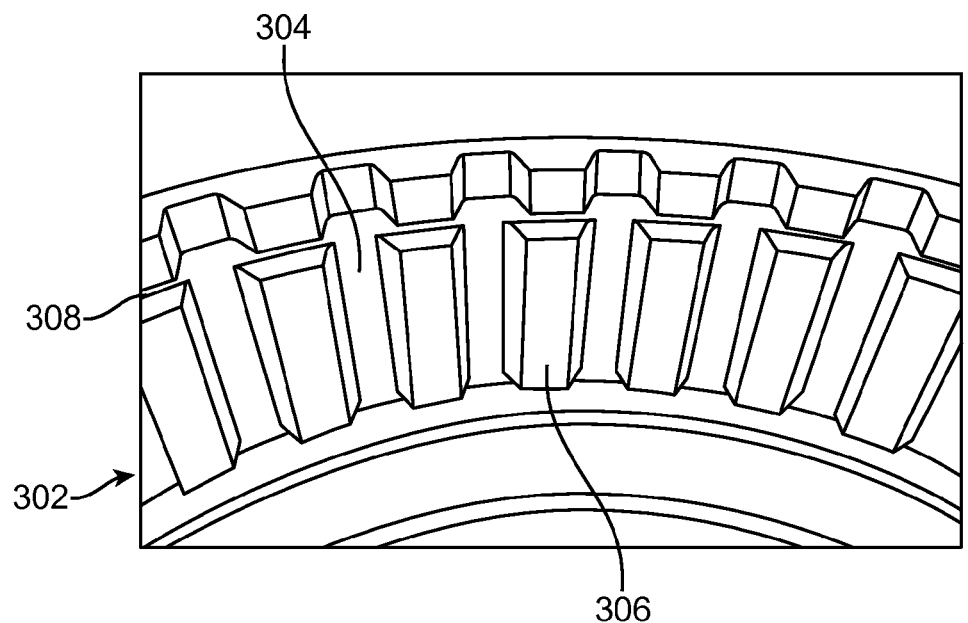
FIG. 3 is a perspective view of a clutch pack portion of the replacement forward drum of FIGS. 1 and 2.
Figure 4:
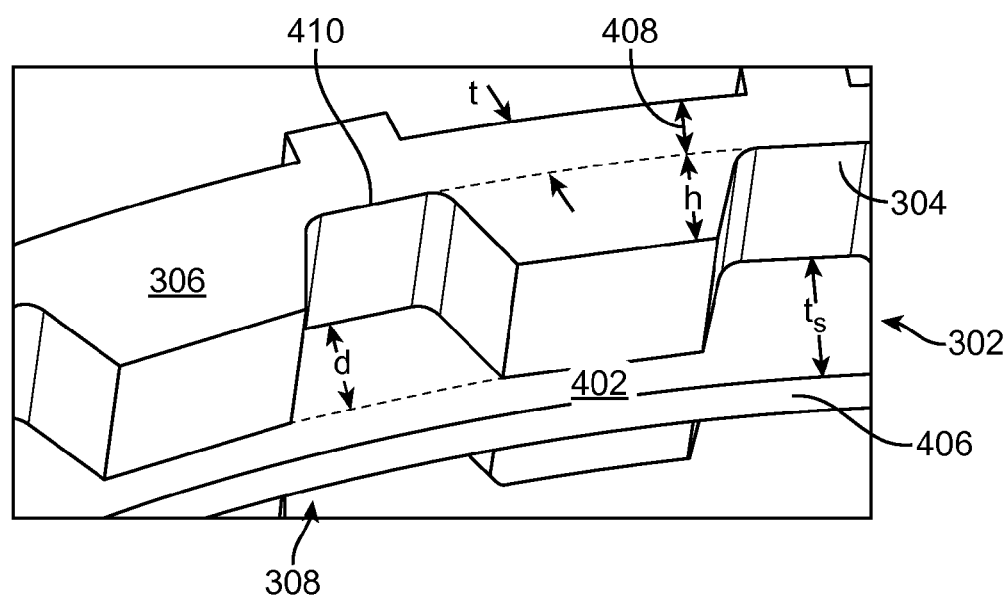
FIG. 4 is another perspective view of the clutch pack portion of FIG. 3 showing a snap ring installed in a snap ring groove.
Figure 5:
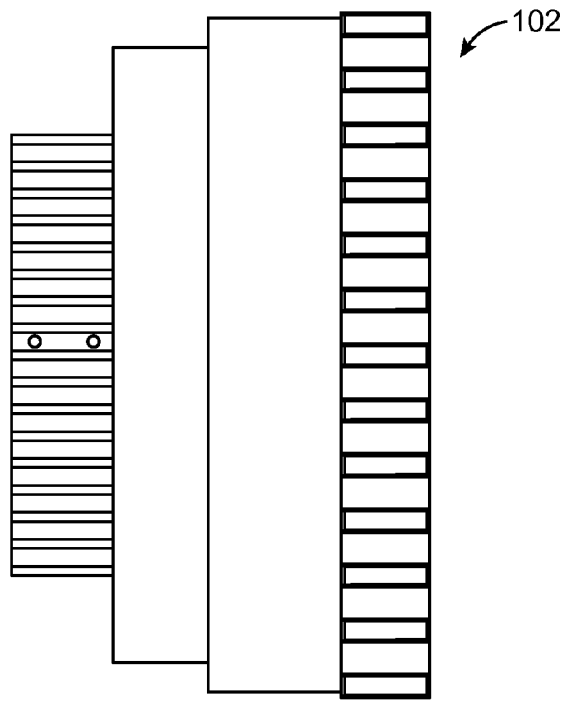
FIG. 5 is a side view of the replacement forward drum of FIGS. 1-4.
Figure 6:
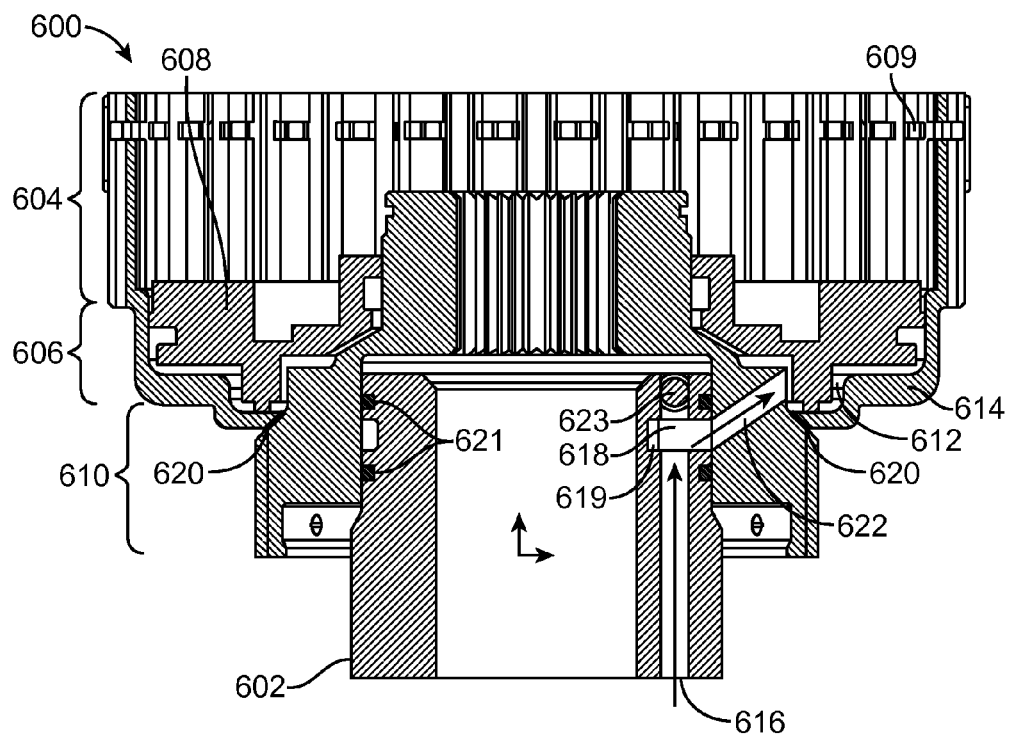
FIG. 6 is a cross section view of a prior art OE forward drum, clutch piston, and stator tube.

Drum 102 may include stator tube portion 118 configured for coupling to OE stator tube 602 (FIG. 2), a piston portion 120 configured to house piston 106 and clutch pack portion 122 configured to house example clutch pack 108. Stator tube portion 118 may include inner wall 124, which may form stator tube bore 126, which may be sized and configured for receipt of OE stator tube 602, as shown in FIG. 2. FIG. 3 illustrates a portion of clutch pack portion 122 in greater detail. As shown in FIG. 3, clutch pack portion 122 may include inner wall 302 having a plurality of axial grooves 304 formed therein between a plurality of axial ridges 306 (only one groove and ridge labeled to avoid clutter), the axial grooves being configured and dimensioned for engagement with a plurality of mating tabs formed on clutch pack separator disks 114 (FIG. 1). Inner wall 302 of clutch pack portion 122 may also include snap ring groove 308, which as described more below, is configured to securely hold a snap ring for securing a clutch pack within the drum FIG. 4 shows snap ring groove 308 with snap ring 402 inserted therein. As shown, exemplary sidewall 302 of clutch pack portion 122 may have a minimum thickness t which may improve the strength of drum 102 in the region of snap ring groove 308, resulting in drum 102 being stronger than Ford's 4R70E/W and 4R75E/W OE clutch drums and not having the same tendency to fail at the snap ring groove as with the OE drum. In the illustrated example, minimum thickness t forms a cylindrical portion 408 of solid metal with a substantially constant thickness, the cylindrical portion extending axially across clutch pack portion 122 and having a height that is greater than or equal to a length of axial grooves 304. Cylindrical portion 408 may also have an inner radius extending from axis of rotation A1 (FIG. 1) that is substantially equal to a radial distance between axis A1 and center 410 of respective ones of axial grooves 304. And cylindrical portion 408 may have an outer radius equal to the radial distance between axis A1 and point 410 plus minimum thickness t. By contrast, the side wall of Ford's 4R70E/W and 4R75E/W OE clutch drums have a minimum thickness of zero. More specifically, in the area of snap ring groove 609 (FIG. 6), there are holes in the sidewall of drum 600, which are formed during the stamping process of the OE sidewall and snap ring groove. As best seen in FIGS. 3 and 4, drum 102 may also have axial ridges 306 which are formed from solid members having a radial height h that may be greater than or equal to minimum thickness t, and the height h may also be substantially the same as a radial depth d of axial grooves 304. By contrast, the corresponding axial ridges of Ford's 4R70E/W and 4R75E/W OE clutch drum 600 (FIG. 6) are hollow with a metal thickness equal to a thickness of the sheet metal used to form the sidewall OE drum.

FIG. 4 illustrates snap ring groove 308 of drum 102 in greater detail, and also shows snap ring 402 installed in the snap ring groove. As shown, snap ring 402 may have a thickness $t_s$ that is greater than radial depth d of axial grooves 304, resulting in inner diameter 406 of the snap ring extending radially inward from axial ridges 306. Having a portion of snap ring 402 extend radially inward of ridges 306 may improve the structural integrity of the contact between the snap ring and an adjacent separator disk, so that the snap ring is in contact with not only the separator disk mating tabs, but also in contact with an entire circumference of an outer portion of the disk itself. Snap ring groove 308 of drum 102 may be configured to provide improved support for snap ring 402 as compared to OE drum 600 by providing a depth d of axial grooves 304 that is greater than a corresponding depth of axial grooves in OE drum 600. An outer diameter of snap ring groove 308 may also be greater than an outer diameter of OE snap ring groove 609. Such an increase in depth would not be possible in OE drum 600 due to the thin-sidewall sheet metal construction. By having an increased depth d, snap ring groove 308 is deeper than OE snap ring groove 609, which provides improved structural support for snap ring 402. Also, as illustrated, drum 102 may have a lower tendency to fail at snap ring groove 308 than OE drum 600 at snap ring groove 609, while at the same time having a snap ring groove with a greater outer diameter than the OE snap ring groove, which improves support for snap ring 402.

Clutch pack portion 604 of Ford's 4R70E/W and 4R75E/W clutch drums 600 (FIG. 6) are made from stamped sheet metal. From research and testing, it has been determined that the common structural failure in the OE clutch drum sidewall at the snap ring groove may be due to weaknesses and stress concentrations in the snap ring groove area of the OE drum sidewall due to material selection and/or the stamping process. Illustrated exemplary drum 102 (FIGS. 1-5) may not have the same tendency to fail because it may be formed from a single forging of metal, such as steel. In one example manufacturing process, a forging of a unitary piece of metal having a shape that approximates drum 102 may be obtained. The forging may then be machined, such as with a high-precision CNC machining process, to form the various features of the drum 102. Such a process may have a variety of benefits, including providing a forward clutch drum with a higher-strength sidewall that does not have the same tendency to fail as Ford's 4R70E/W and 4R75E/W clutch drums. Such a process may also result in a drum that does not have the same stress concentrations found in the sidewall of the OE drums in the area of the snap ring groove. Such a design approach may also be more cost-effective, for example, it eliminates the need to weld portions of the drum together, and ensures tight concentricity tolerances between the various portions of the drum.

As shown in FIG. 2, drum 102 may include oil feed passageway 202 which is designed and configured to provide fluid communication from one of Ford's 4R70E/W or 4R75E/W stator tube's oil feed passageway 616 to piston cavity 204 of drum 102, so that drum 102 may be used as a replacement drum for one of Ford's 4R70E/W or 4R75E/W forward drum assemblies. As discussed above, in the example shown, clutch pack portion 122, piston portion 120, and stator tube portion 118 may be formed from a single unitary metal forging and are not formed by welding two pieces together. Thus, angled oil feed bores like OE bores 622 (FIG. 6) may not be easily machined in drum 102 because clutch pack portion 122 and piston portion 120 block access for a drill. Instead, drum 102 includes oil feed passageway 202 for providing fluid communication between first oil feed plenum 618 of OE stator tube 602 and piston cavity 204. As shown, oil feed passageway 202 may include second circumferential groove 206 formed around a circumference of inner wall 124 of stator tube portion 118, the second circumferential groove forming a second oil feed plenum 208 that, in the illustrated example, extends in substantially the same plane as the first oil feed plenum, the plane being substantially perpendicular to axis of rotation A1, such that the first and second plenums may form a combined plenum, which may extend 360 degrees around the circumference of the stator tube portion inner wall 124 and may extend across interface 210 between OE stator tube 602 and drum 102. Oil feed passageway 202 may also include at least one oil feed hole 212 for providing fluid communication between second plenum 208 and piston cavity 204. Exemplary oil feed hole 212 may be one of a plurality of holes (only one illustrated) positioned about a circumference of drum 102. In one example, the number of holes may be determined based on a total cross sectional area of the holes, such that a total pressure drop from OE stator tube 602 to piston cavity 204 is substantially the same as a corresponding total pressure drop between OE stator tube 602 and the OE drum cavity. At least one of oil feed holes 212 may extend along a central longitudinal axis A2 that is substantially parallel to axis of rotation A1 and that is substantially perpendicular to first and second plenums 618 and 208. In alternative embodiments, oil feed holes 212 may have varied orientations from each other and/or may have an alternative orientation to at least one of the plenums and axis of rotation. For example, in some embodiments, second oil feed plenum 208 may be formed by a groove extending in a first direction into inner wall 214 and in a second direction around the inner wall, and piston portion 120 may include at least one oil feed hole formed at an angle with respect to the first direction. In some embodiments, the angle may be in the range of greater than approximately zero degrees and less than approximately 180 degrees, and in some embodiments, between approximately 30 degrees and approximately 150 degrees, and in some embodiments, between approximately 60 degrees and approximately 120 degrees, and in some embodiments, approximately 90 degrees. Such an oil feed passageway arrangement may have a variety of benefits, including ease of manufacture, and for providing fluid communication between replacement forward drum 102 and OE stator tube 602, which allows the replacement drum to be installed in one of Ford's 4R70E/W or 4R75E/W transmissions without needing to replace the OE stator tube with a replacement stator tube.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A replacement forward drum for an original equipment ("OE") transmission configured for installation with an OE stator tube having a sidewall with an outer surface and a first oil feed plenum formed in the sidewall extending around the outer surface, the forward drum comprising:
   a unitary annular body member formed around an axis of rotation comprising
      a stator tube portion having an inner wall defining a stator tube bore sized and configured for receipt of the OE stator tube therein, and a second oil feed plenum formed in a direction into and around said inner wall, the second oil feed plenum being positioned to communicate with the first oil feed plenum when the OE stator tube is received in said stator tube bore,
a clutch pack portion having a plurality of axial grooves, the axial grooves being configured and dimensioned for engagement with a plurality of tabs formed on clutch pack separator disks; and
a piston portion disposed between the stator tube portion and the clutch pack portion, the piston portion defining a piston cavity configured and dimensioned for receipt of a forward piston therein and at least one oil feed hole extending between the second oil feed plenum and the piston cavity;
wherein said second oil feed plenum is formed by a circumferential groove in said inner wall.

2. A replacement forward drum according to claim 1, wherein said at least one oil feed hole is substantially parallel to said axis of rotation.

3. A replacement forward drum according to claim 2, wherein said circumferential groove is located in a first plane that is substantially perpendicular to said axis of rotation.

4. A replacement forward drum according to claim 3, wherein both the first oil feed plenum and said second oil feed plenum are located in said first plane, thereby forming a combined oil feed plenum extending around said axis of rotation.

5. A replacement forward drum according to claim 4, wherein said replacement drum is formed from a steel forging.

6. A replacement forward drum according to claim 1, wherein the replacement forward drum is configured to be rotatably disposed on the OE stator tube.

7. A forward drum kit for replacing an original equipment ("OE") forward drum, the OE forward drum having a sidewall with axial grooves and ridges formed therein and having a snap ring groove having a first outer diameter, the kit comprising:
a replacement forward drum with a clutch pack portion including a sidewall with a minimum thickness t that is greater than zero, the sidewall having an inner surface, the inner surface having a plurality of axial ridges and grooves, the plurality of axial ridges being configured and dimensioned for receipt of separator disk mating tabs;
wherein the plurality of axial ridges formed in the replacement forward drum sidewall are solid members each having a radial height h of solid material, wherein h is greater than t;
wherein said replacement forward drum is configured to be operably coupled to a OE stator tube having a sidewall with an outer surface and a first oil feed plenum extending into the sidewall from the outer surface;
wherein said replacement forward drum further includes:
a stator tube portion having an inner wall defining a stator tube bore sized and configured for receipt of the OE stator tube therein;
a piston portion defining a piston cavity sized and configured for receipt of a forward piston therein; and
an oil feed passageway designed and configured to provide fluid communication between the OE stator tube first oil feed plenum and said piston cavity, said oil feed passageway including a second oil feed plenum formed by a circumferential groove in said stator tube portion inner wall.

8. A forward drum kit according to claim 7, wherein said replacement forward drum axial grooves each have a radial depth d, wherein d is substantially the same as h.

9. A forward drum kit according to claim 7, wherein said replacement forward drum sidewall comprises a cylinder of solid metal having a substantially constant thickness and a height, said thickness of said cylinder being substantially equal to said minimum thickness t.

10. A forward drum kit according to claim 7, wherein said replacement forward drum is a unitary member formed from a steel forging.

11. A method of modifying an original equipment ("OE") forward drum assembly having a OE forward drum having a sidewall with axial grooves and ridges formed therein and having a snap ring groove, the axial ridges having a radial thickness and the snap ring groove having a first outer diameter, the OE forward drum having a tendency to fail during operation due to the sidewall separating at the snap ring groove, the method comprising:
providing a replacement forward drum having a sidewall formed around an axis of rotation with a plurality of axial ridges and axial grooves, each of the axial grooves having a radial depth d and each of the axial ridges being solid members with a radial height h of solid material, wherein h is greater than the radial thickness of material forming the OE forward drum axial ridges and wherein h is approximately equal to d;
wherein the sidewall of the replacement forward drum further includes a snap ring groove having a second outer diameter, wherein the second outer diameter is greater than the first outer diameter of the OE forward drum snap ring groove.

12. A method of modifying an OE forward drum assembly according to claim 11, wherein said replacement drum sidewall has a minimum thickness t, and wherein h is greater than t.

13. A method of modifying a OE forward drum assembly according to claim 11, wherein the OE forward drum is formed from two pieces welded together and wherein said providing includes providing a replacement forward drum that is unitary and formed from a metal forging.

14. A method of modifying a OE forward drum assembly according to claim 13, wherein said OE forward drum includes feed oil bores extending linearly between an inner wall of the drum and a piston cavity of the drum;
said providing further including providing the replacement forward drum with a modified feed oil passageway that allows the unitary replacement drum to be installed with an OE stator tube, said modified feed oil passageway replacing the OE feed oil bores and including an oil feed plenum extending 360 degrees around an inner wall of the replacement forward drum.

15. A method of modifying a forward drum assembly having an original equipment ("OE") forward drum having feed oil bores extending linearly between an inner wall of the drum and a piston cavity of the drum, the method comprising:
providing a unitary replacement forward drum with a modified feed oil passageway that allows the replacement drum to be installed with an OE stator tube, said modified feed oil passageway replacing the OE forward drum feed oil bores and including an oil feed plenum formed by a circumferential groove in an inner wall of the replacement forward drum.

* * * * *